US006703110B2

(12) United States Patent
Stitchick (10) Patent No.: US 6,703,110 B2
(45) Date of Patent: Mar. 9, 2004

(54) NON-SKID SURFACE FOR CONTAINERS (75) Inventor: David M. Stitchick, Wooster, OH (US)

(73) Assignee: Rubbermaid Incorporated, Wooster, OH (US)

(*) Notice: Subject to any disclaimer, the term of this patent is extended or adjusted under 35 U.S.C. 154(b) by 0 days.

(21) Appl. No.: 10/058,488

(22) Filed: Jan. 28, 2002

(65) Prior Publication Data
US 2003/0143374 A1 Jul. 31, 2003

(51) Int. Cl.[7] .............................. B65D 19/38; B32B 3/00

(52) U.S. Cl. .................. 428/156; 428/141; 248/346.11; 108/57.29; 234/2; 430/269

(58) Field of Search ................................ 428/141, 156; 248/346.11; 108/57.29; 234/2; 430/269

(56) References Cited

U.S. PATENT DOCUMENTS

| 63,653 | A |  | 4/1867 | Rand | |
|---|---|---|---|---|---|
| 262,452 | A |  | 8/1882 | McLean | |
| D13,806 | S |  | 3/1883 | Ball et al. | |
| 2,036,572 | A |  | 4/1936 | Frost | 229/2.5 |
| 2,128,118 | A |  | 8/1938 | Burford | 45/28 |
| 2,206,694 | A |  | 7/1940 | Greene | 47/38 |
| 2,893,163 | A | * | 7/1959 | Hazel, Jr. | 248/346.11 |
| 3,220,681 | A |  | 11/1965 | Erbert | 248/119 |
| 3,443,717 | A |  | 5/1969 | Wettlen et al. | 200/66 |
| 3,642,239 | A |  | 2/1972 | Zeiler, Jr. | |
| 4,137,356 | A |  | 1/1979 | Shoemaker et al. | 428/211 |
| 4,140,828 | A |  | 2/1979 | Copping | 428/167 |
| 4,426,013 | A |  | 1/1984 | Cherchian et al. | 220/66 |
| D290,999 | S |  | 7/1987 | Novak | D24/8 |
| 4,732,292 | A |  | 3/1988 | Supik | 220/70 |

(List continued on next page.)

FOREIGN PATENT DOCUMENTS

| FR | 2 674 510 |  | 3/1991 |
| GB | 001363765 A |  | 8/1974 |
| GB | 2 059 920 A |  | 4/1981 |
| JP | 2000051045 A | * | 2/2000 |
| WO | WO 00/66452 |  | 11/2000 |

OTHER PUBLICATIONS

PCT International Search Report issued in PCT/US03/00469, Mar. 6, 2003.

Primary Examiner—William P. Watkins, III
(74) Attorney, Agent, or Firm—Marshall, Gerstein & Borun LLP (57) ABSTRACT A non-skid surface for containers having a generally planar base layer with an upper surface, a lower surface, and a surface area. A plurality of bumps are disposed spaced apart over and projecting upward relative to the upper surface over a substantial portion of the surface area of the base layer. The bumps are shaped and arranged to accept a container placed on the non-skid surface such that a support rim of a bottom of the container registers between bumps and rests solely on the upper surface of the base layer. The bumps are shaped and arranged to accept a container in this manner in a plurality of positions over the surface area. A method of forming the non-skid surface can include selecting at least a size and a shape of a first container bottom rim. A plurality of first container rim locations are plotted in a first repeating location pattern of a desired spacing. Each of the plurality of first container rim locations corresponds to the first container bottom rim size and shape. A plurality of protrusions are provided on a surface and are positioned and arranged spaced apart over and projecting upward from the surface over a substantial portion of the surface area. The plurality of protrusions are arranged in a repeating bump pattern that corresponds to the first repeating location pattern so as not to overlie the plurality of first container rim locations.

20 Claims, 7 Drawing Sheets

U.S. PATENT DOCUMENTS

| | | |
|---|---|---|
| D296,421 S | 6/1988 | Rayner .......................... D9/379 |
| 5,018,695 A | 5/1991 | Bishop .................... 248/346.1 |
| 5,230,601 A | 7/1993 | Apps et al. |
| 5,306,544 A | 4/1994 | Pommeranz et al. ........ 428/195 |
| 5,309,670 A * | 5/1994 | Bates ............................ 47/71 |
| 5,353,926 A | 10/1994 | Yeh ............................. 206/217 |
| 5,685,452 A | 11/1997 | Kristoffersson ............. 220/608 |
| D387,250 S | 12/1997 | Tubbesing ................... D7/624 |
| 5,740,883 A | 4/1998 | Trank ......................... 182/129 |
| 6,101,955 A | 8/2000 | Salce ...................... 108/51.11 |

* cited by examiner

NON-SKID SURFACE FOR CONTAINERS

FIELD OF THE INVENTION

The invention is generally related to work surfaces, and more particularly to a non-skid work surface for containers such as cans.

BACKGROUND OF THE INVENTION

One problem associated with using product containers or cans such as paint cans is that the container may inadvertently slide across a work surface on which it rests. The container may be resting on a surface that is accidentally bumped or raised at one end such that the container slides across and falls from the work surface, resulting in a spill. With paint cans, spilled paint can easily damage floors, furniture, and the like. Also, thorough clean up of a paint spill is always difficult and sometimes not entirely possible. Such a clean up also can take a significant amount of time which increases the overall time it can take to complete a painting project.

It is known to provide a toolbox with a work surface on top of the box lid. A lid surface can be provided with a non-skid feature to inhibit slippage of a paint can placed on the lid surface. U.S. Pat. No. 5,740,883 discloses such a toolbox lid with a raised ring used to inhibit slippage of a paint can placed within the ring.

Different types of containers or cans can hold many different types of products. Most containers typically rest on a surface when being used. It may be undesirable to spill any one of these other products, including carbonated beverages, chemical cleaning products, wood stains and other protective finishes, and the like. Paint, stain, and protective finish cans are typically circular cylinders. Product containers are also available in non-circular shapes and suffer from the same problems noted above.

BRIEF DESCRIPTION OF THE DRAWINGS

Exemplary non-skid surfaces for containers and methods in accordance with the teachings of the present invention are described and explained in greater detail below with the aid of the drawing figures in which.

DETAILED DESCRIPTION OF THE PREFERRED EMBODIMENTS

The present invention is directed to a non-skid surface for containers that is well suited for work areas and for use on objects in a work area such as a toolbox lid. In general, the non-skid surface constructed in accordance with the teachings of the present invention has a plurality of raised bumps or protrusions arranged in a predetermined pattern or array. The pattern is designed so that a container such as a paint can can be placed in any one of a plurality of available positions on the surface and yet the surface will provide the intended non-skid function. The surface disclosed herein also is intended to accommodate, in one example, two or more different sized containers such as a gallon paint can or a quart paint can, each in one of a plurality of different locations on the surface.

Figure 1:
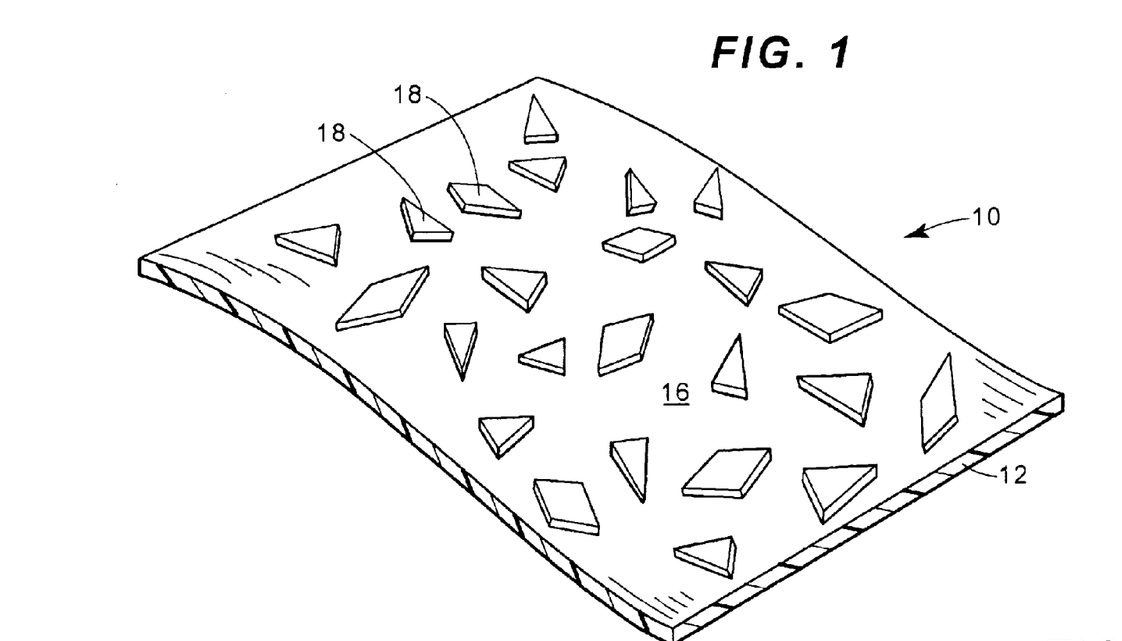
FIG. 1 is a perspective view of one example of a portion of a non-skid work surface constructed in accordance with the teachings of the present invention.

Referring now to the drawings, FIG. 1 is a perspective view of one example of a portion of a non-skid work surface 10 constructed in accordance with the teachings of the present invention. The non-skid work surface 10 has a base layer 12 with a lower surface 14 and an upper surface 16 opposite the lower surface. In one example, the lower surface 14 is generally planar and can rest on a flat surface within a work environment such as on top of a toolbox lid or the like. As will be evident to those having ordinary skill in the art, the base layer 12 will have an outer perimeter (not shown) that defines a size and a shape of the work surface 10. The size and shape of the work surface can vary according to the needs of a particular intended use and according to the type and size of the container or containers for which a work surface is adapted.

As shown in FIGS. 1–4, the upper surface 16 of the base layer 12 has a plurality of raised bumps or protrusions generally identified herein as bumps 18, and more specifically identified in greater detail below in describing the arrangement of the bumps. The plurality of raised bumps 18 are generally disposed spaced apart over the upper surface 16 and project upward from the upper surface. The bumps 18 each have a perimeter wall or sides 19 that can be generally perpendicular to the upper surface, other than a slight draft angle a taper for molding purposes. The bumps 18 are scattered over a substantial portion of the surface area of the base layer 12. Thus, a majority of the work surface 10 can accommodate one or more containers and can provide the non-skid feature.

Figure 5:
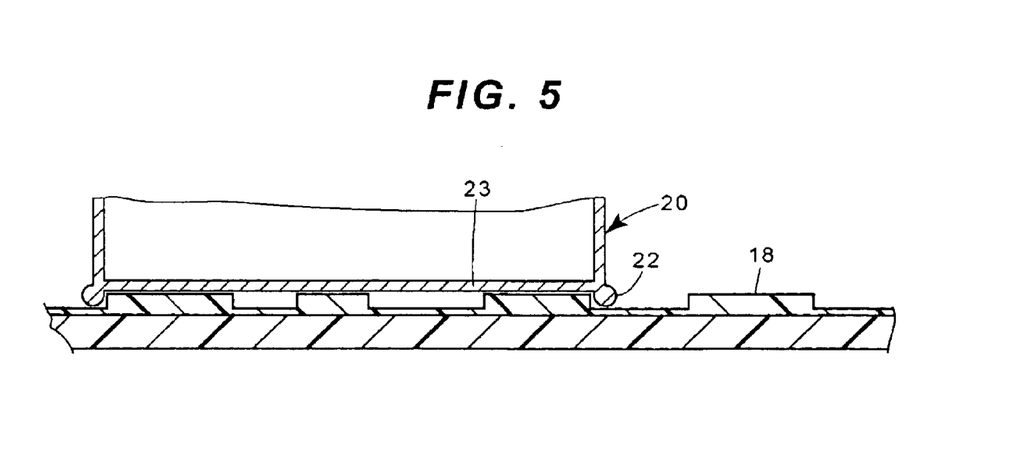
FIG. 5 is a cross section of another example of a work surface constructed in accordance with the teachings of the present invention.

In general, the bumps 18 are of a predetermined shape and size and are further arranged in a particular manner to provide the non-skid function and to provide multiple locations for resting a container. The bump arrangement is generally designed to accept a container 20, as shown in FIG. 5, placed on the upper surface 16 such that a bottom rim 22 of the container registers between bumps 18 and rests only on the upper surface of the work surface 10. Such a container 20 has a bottom surface 23 that is elevated above a height of the bumps 18 by the downwardly depending bottom rim 22. The bumps 18 are further arranged to accept a container 20 in this manner in a plurality of different locations over the work surface 10.

Figure 2:
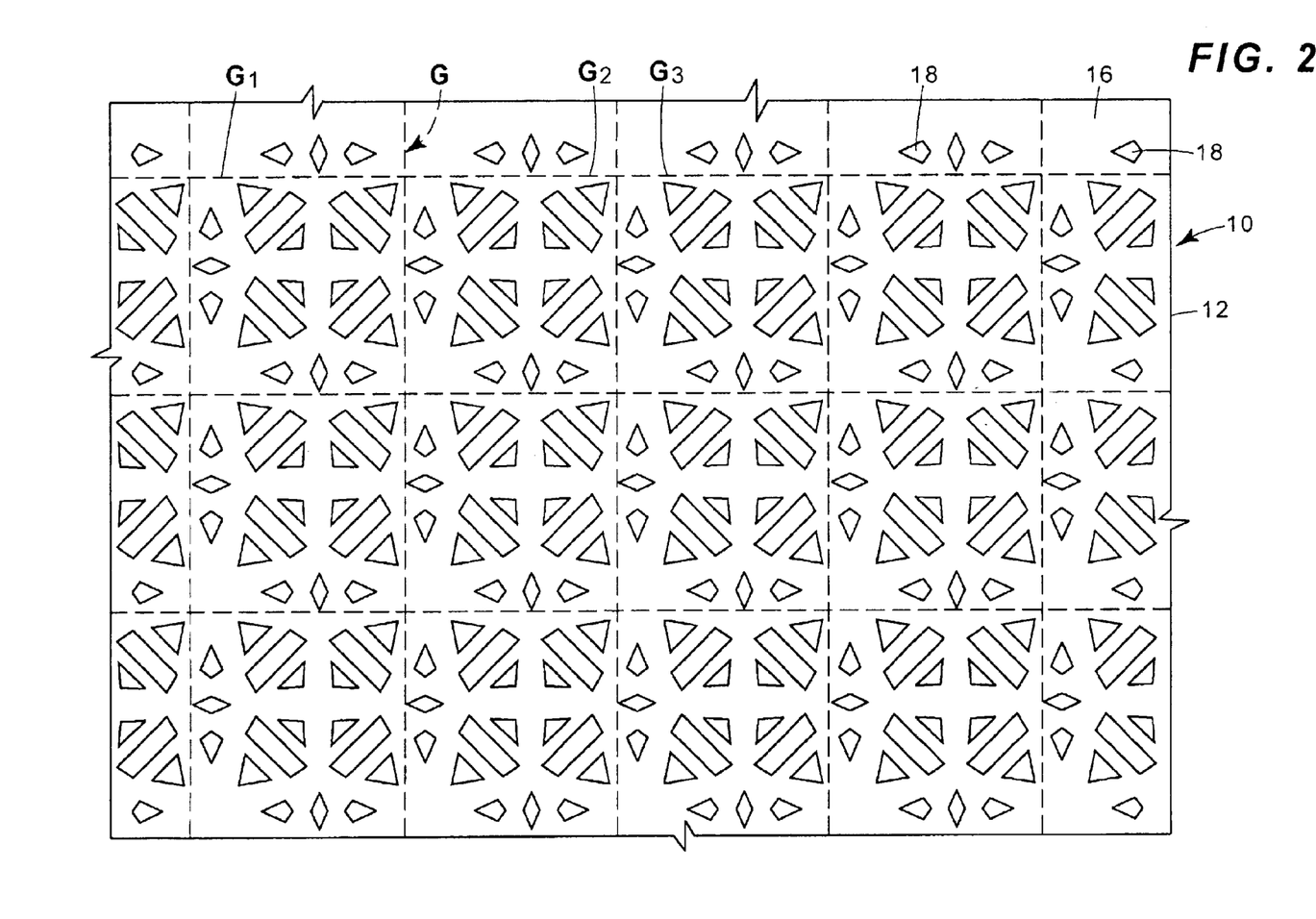
FIG. 2 is a top plan view of the work surface shown in FIG. 1 and with a grid overlay shown in phantom to illustrate the repeating pattern of bumps or protrusions.
Figure 4:
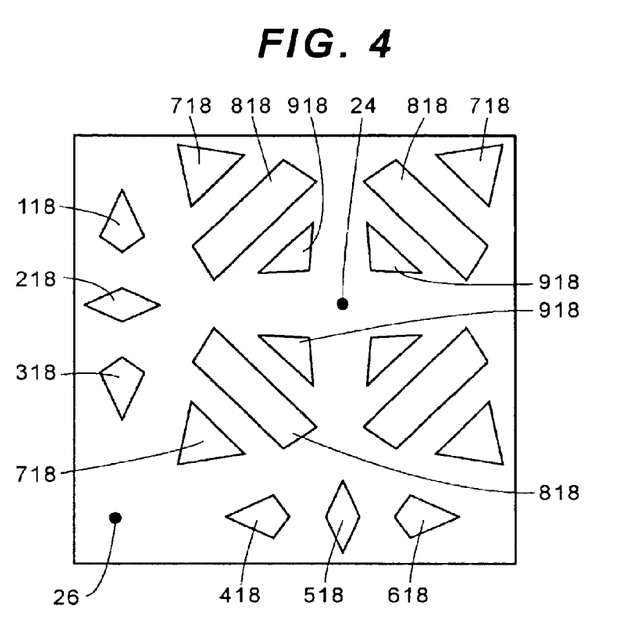
FIG. 4 is a top plan view of one grid block of the repeating pattern as shown in FIG. 2.

Referring to FIGS. 2 and 4, one disclosed example of a bump pattern to achieve this non-skid function is shown and described. FIG. 2 is a top plan view of the work surface 10 in accordance with the teachings of the present invention. A grid overlay G is shown in phantom and illustrates a plurality of grid blocks or regions G1, G2, G3, and so on, defined over the surface area of the work surface 10. Each of the grid blocks contains an identical pattern or array of the bumps 18 that is repeated in each grid block over the entirety of the work surface. FIG. 4 illustrates an enlarged top plan view of only one grid block G1.

In this disclosed example, each grid block such as the block G1 shown in FIG. 4 has a plurality of bump subsets. For example, a first bump subset has three bumps or protrusions 118, 218, and 318 in a linear pattern and arranged in a vertical orientation. Herein, the terms "vertical" and "horizontal" are utilized solely to define the orientation of protrusions as shown in the drawings to other of the protrusions. A second subset of bumps has three additional protrusions 418, 518, and 618 in a linear pattern and arranged in a horizontal orientation. The first and second subsets are essentially identical to one another except that they are arranged 90° relative to one another. In this disclosed example, each of these two subsets has centrally located, diamond-shaped rhombus bumps (218, 518) sandwiched between a pair of oppositely facing diamond-shaped deltoid bumps (118, 318 and 418, 618, respectively). In this example, many of the sides 19 of the various deltoid and rhombus protrusions are very slightly non-linear when viewed in plan view. However, any one or more of the sides 19 of these protrusions can alternatively be curved to a greater degree or can be linear or straight sides as desired without departing from the spirit and scope of the present invention.

Each grid block pattern also has four additional protrusion or bump subsets arranged laterally to the right of the first subset and horizontally above the second subset. Each one of these additional subsets has three protrusions 718, 818, and 918. Similar to the arrangement of the first two protrusion subsets, a centrally positioned protrusion 818 is sandwiched between a pair of oppositely facing protrusions 718 and 918 in each of these four subpatterns. The center protrusion 818 in each subpattern is in the form of a bi-concave lens trapezoid shape. The two elongate sides are concave inward and curved slightly to accommodate the container shapes as described below. The two shorter sides or ends are also shown as slightly curved. However, the protrusions 818 can alternatively include four linear sides to form a bi-lateral, symmetrical trapezoid or can include greater curved sides as desired for a particular work surface application.

These four protrusion or bump subsets are arranged in an "X" pattern defining a center point 24 and are positioned 90° relative to one another and arranged extending radially outward about this center point. In addition, the center protrusions 218 and 518 of the first two protrusion or bump subsets are each aligned horizontally and vertically respectively with this center point 24.

As will be evident to those having ordinary skill in the art, the grid overlay G can be shifted relative to the individual bumps 18 from that described and yet will still produce a repeating pattern or array over the work surface that is different than the one just described. The grid overlay G has been selected herein simply to assist in describing the exemplary disclosed bump array or pattern.

As is shown in FIG. 2, each grid block G1, G2, G3, and so on, has the same bump pattern and also includes the first center point 20 positioned and repeated identically in each of the other grid blocks. In this example, each grid block also has a second center point 26 positioned identically relative to the other grid blocks. In this example, the center point 26 is positioned centered between adjacent horizontal and vertical ones of the first and second bump subsets. As described in greater detail below, these center points 24 and 26 determine the center location position of a properly positioned container that is rested on the work surface 10. The container will be properly registered between bumps in accordance with the teachings of the present invention. The first center point 24 defines a center for one container size (gallon can is this example) and the second center point 26 defines a center for a second container size (quart can in this example) as is described below.

Referring now to FIG. 5, an alternative cross section for a construction of a work surface 10 in accordance with the teachings of the present invention is shown. In the example shown in FIG. 1, the work surface 10 is formed of an integrated unitary structure wherein the base layer 12 and the bumps 18 are provided from the same material. In the example in FIG. 1, the work surface 10 is molded from a rubber material and the bumps 18 are integrally molded therewith. In the example shown in FIG. 5, a separate base sheet or layer 28 is provided and has a film sheet or layer 30 adhered thereto. The bumps 18 are provided on the film layer 30. The example shown in FIG. 5 lends itself to being formed having a base layer 24 of one material and bumps 18 and film layer 26 formed from another material, if so desired. Though not shown herein, the sheet 28 or base layer 12 can have an adhesive layer on the lower surface 14 for adhering the work surface. Also, the base sheet 28 can have an adhesive layer sandwiched between it an the film sheet 30 to adhere the sheets together.

Figure 3:
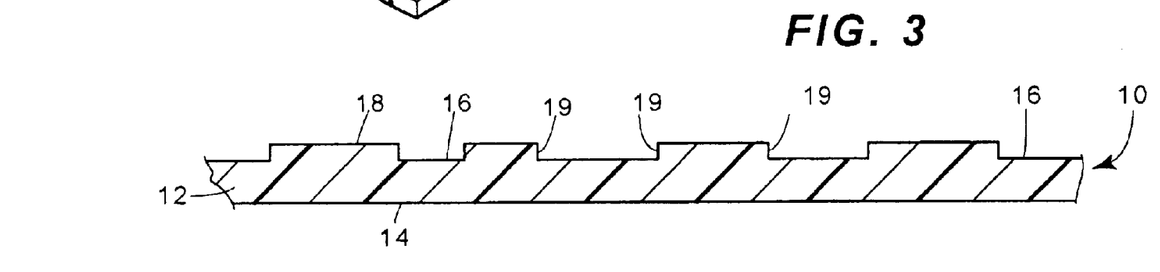
FIG. 3 is a cross section of an exemplary work surface such as that shown in FIG. 1.
Figure 6:
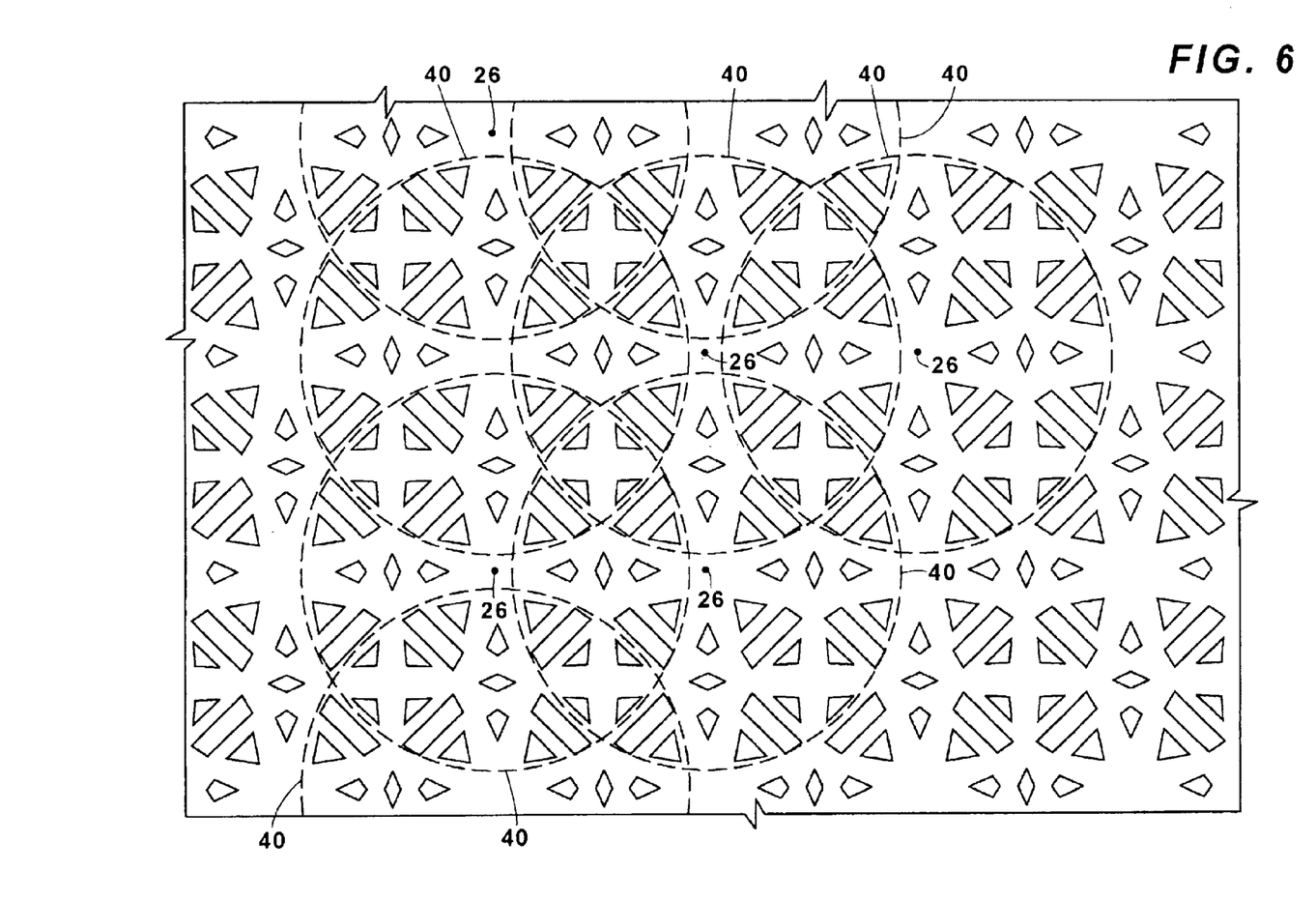
FIG. 6 is a phantom illustration of a plurality of permissible container support rim locations of a first size and shape overlying one another and spaced apart according to the protrusion grid shown in FIG. 2.
Figure 7:
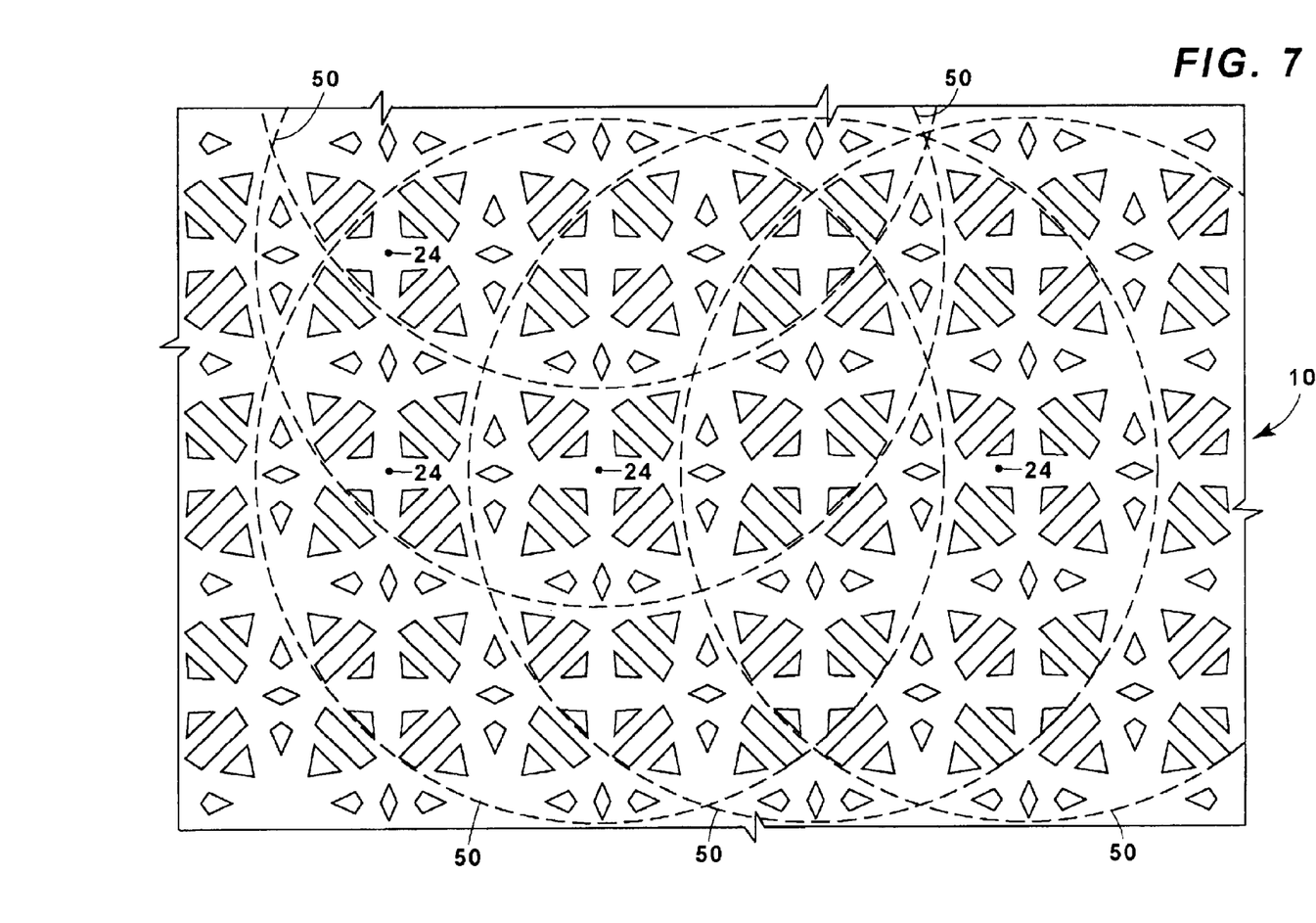
FIG. 7 is a phantom illustration of a plurality of permissible container support rim locations of a second size and shape overlying one another and spaced apart according to the protrusion grid shown in FIG. 2.
Figure 8:
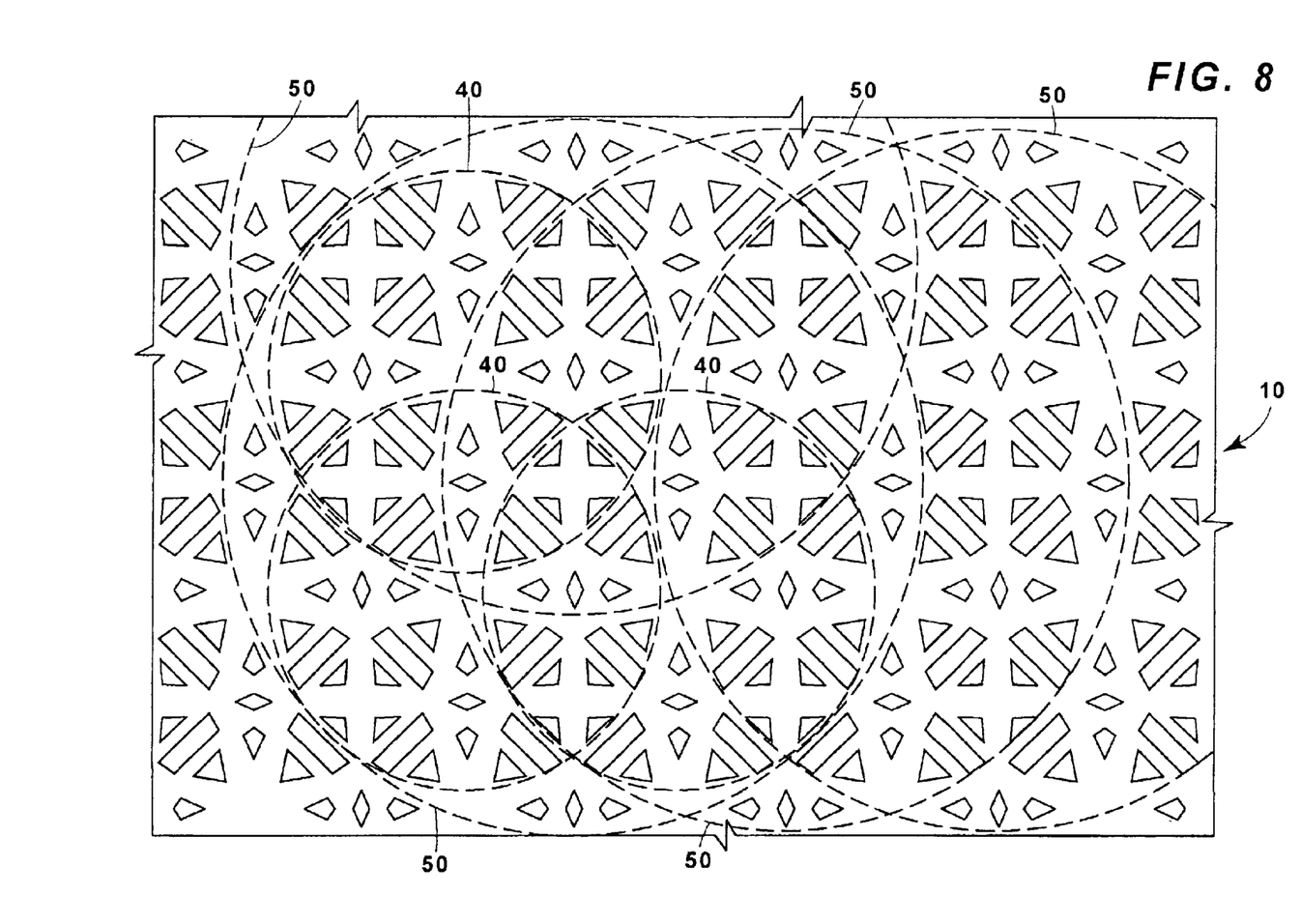
FIG. 8 is a phantom illustration of the first and second plurality of rim locations shown in FIGS. 6 and 7 overlying one another.

Referring now to FIGS. 6–8, a plurality of first container locations 40 are illustrated overlying the work surface 10. These container locations 40 represent one size of a circular container such as a quart sized paint can 20 as shown in FIG. 3. The circular ring shaped locations 40 illustrate the plurality of positions that can accommodate a quart-sized can utilizing the disclosed exemplary work surface 10. The grid G spacing will determine the spacing of the adjacent selectable locations 40 for placing a quart-sized paint can on the work surface. It has been found that a two-inch grid spacing that utilizes the disclosed pattern is an optimum spacing and thus a quart-sized paint can be spaced anywhere on the work surface at two-inch intervals as desired both vertically and horizontally.

As can be seen in FIG. 6, each quart-sized ring or location 40 lies entirely between protrusions 18 so that the container rim 22 rests entirely on the upper surface 16 of the base layer 12. In this manner, as shown in FIG. 3, the bumps 18 lie both interior to the rim 22 and exterior to the rim and closely adjacent to the rim. These adjacent bumps prevent the paint can from sliding laterally in any direction. As can be seen clearly in FIG. 6, the center point locations 26 represent the quart-sized container centers for the various locations 40 utilizing this disclosed bump pattern.

FIG. 7 illustrates a plurality of gallon-sized, circular ring locations 50 overlying one another on the work surface 10. These rings 50 are associated with the center points 24. Again, each of the rings 50 is spaced at the same intervals as the grid blocks and each ring lies entirely between protrusions 18 to provide the non-skid feature of the work surface for gallon-sized containers in this example.

FIG. 8 illustrates the plurality of both the gallon-sized locations 50 and the quart-sized locations 40 plotted on the work surface 10 to illustrate that the precise positioning of the bumps 18 provide clearance for the two container sizes in the plurality of locations over the work surface. As will be evident to those having ordinary skill in the art, such a bump pattern can be devised for containers other than circular containers as long as the containers have bottom rims. Such containers can include oil containers, soda cans, or the like. In addition, the bump shape, array or pattern, and arrangement can vary from that in the illustrated example.

Figure 9:
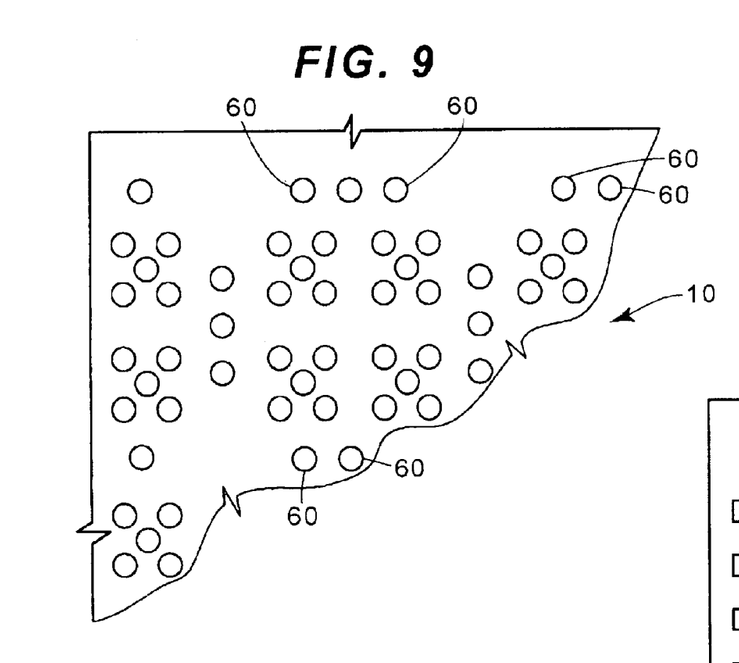
FIG. 9 is a top plan view of another example of a work surface constructed in accordance with the teachings of the present invention and including the phantom illustration of overlying shapes of FIG. 8 overlaid thereon.
Figure 10:
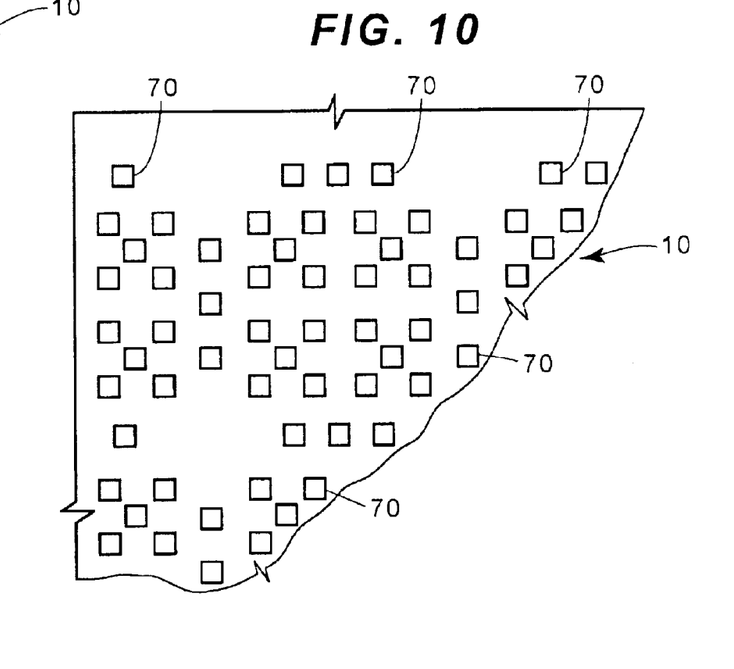
FIG. 10 is a top plan view of another example of a work surface constructed in accordance with the teachings of the present invention and including the phantom illustration of overlying shapes of FIG. 8 overlaid thereon.

FIGS. 9 and 10 illustrate two examples of essentially the same grid pattern bumps 18, but utilizing different shaped bumps. In the example of FIG. 9, each of the bumps 60 are identically shaped circular protrusions. In the example of FIG. 10, bumps 70 are identically shaped square protrusion.

A method of producing the work surface 10 can first include plotting a plurality of locations for a given container size, shape, and spacing, such as that shown in FIGS. 6 or 7. A next step can be to plot, if desired, a second plurality of locations for a given second container size, shape, and spacing, such as that shown in FIG. 8. A programmable computer or a computerized machine, such as a CNC cutting machine, can be used and programmed to plot the plurality of desired rim locations for or on the substrate for a work surface material. The locations can alternatively be plotted manually by using a template or a desired container rim itself. The locations can be manually or automatically plotted at spaced intervals as desired.

The protrusions and bump pattern necessary to create the regions between protrusions that define the multiple container locations can be formed in a number of ways. The bumps can also be formed either by positively forming the bumps or by negatively forming the regions to thereby leave behind the bumps.

In one example, a cutting device in the shape of a desired container rim can be positioned on the work surface substrate at each desired location to mark the locations. The cutting device can be used to cut into the work surface to a desired depth at each selected location. After all locations for the one or more rim sizes are cut into the substrate, the only material left is the substrate base and the plurality of bumps or projections. A CNC machine can also be used to cut into each substrate to achieve this same result. Alternatively, such a CNC machine can be programmed and used to determine an appropriate bump pattern and to reverse cut a desired bump pattern into a metal mold after the pattern is determined. The mold can then be used to fabricate a plurality of non-skid work surfaces as desired, or to fabricate a film layer to be attached to a flat substrate as described above.

If the above process of forming the multiple rim locations is not used, a next step, after plotting the rim locations can be to determine the desired protrusion pattern over the plots of container locations such that protrusions are located only between the various container location markers. The next step is to then form, by molding, machining, cutting, or other suitable means the protrusion pattern to form the work surface.

Although certain methods and non-skid surfaces for cans have been disclosed and described herein in accordance with the teachings of the present invention, the scope of coverage of this patent is not limited thereto. On the contrary, this patent covers all embodiments of the teachings of the invention fairly falling within the scope of the appended claims, either literally or under the doctrine of equivalents.

What is claimed is:

1. A non-skid surface for containers having a bottom surface and a perimeter support rim depending downward relative to and surrounding the bottom surface, the non-skid surface comprising:
   a generally planar base layer having an upper surface, a lower surface, and a surface area; and
   a plurality of bumps disposed spaced apart over and projecting upward relative to the upper surface over a substantial portion of the surface area of the base layer, wherein the plurality of bumps are shaped and arranged to accept a container placed on the non-skid surface in any one of a plurality of overlapping positions such that the support rim registers between bumps and rests solely on the upper surface of the base layer in any of the plurality of overlapping positions.

2. A non-skid surface according to claim 1, wherein the plurality of bumps are integrally formed with the base layer.

3. A non-skid surface according to claim 2, wherein the non-skid surface is integrally molded from a rubber material.

4. A non-skid surface according to claim 2, wherein the non-skid surface is integrally stamped from a metallic material.

5. A non-skid surface according to claim 2, wherein the non-skid surface is integrally formed from a solid piece of a wood material.

6. A non-skid surface according to claim 1, wherein the plurality of bumps are attached to the base layer after formation of the base layer.

7. A non-skid surface according to claim 6, wherein the plurality of bumps are provided on a separate sheet and wherein the separate sheet is adhered to the upper surface of the base layer.

8. A non-skid surface according to claim 1, wherein the plurality of bumps comprises:
   a repeating pattern of raised projections that are positioned and arranged to define a plurality of spaced apart overlapping identically shaped regions between projections corresponding to a shape of the support rim, each of the regions capable of accepting the support rim.

9. A non-skid surface according to claim 8, wherein the identically shaped regions are circular for accepting a circular shaped support rim.

10. A non-skid surface according to claim 1, wherein the plurality of bumps comprises:
    a repeating pattern of raised projections arranged to define a plurality of spaced apart overlapping identically shaped regions between projections corresponding to a shape of the container, a portion of the regions sized for accepting a first container size, and the remainder of the regions sized for accepting a second container size.

11. A non-skid surface according to claim 10, wherein the regions are each circular shaped.

12. A non-skid surface for containers, the non-skid surface comprising:
    a generally pianar base layer having an upper surface, a lower surface, and a surface area; and
    a plurality of repeated patterns of spaced apart raised projections disposed over a substantial portion of the surface area of the base layer and projecting upward relative to the upper surface, wherein the plurality of repeated patterns are arranged to define a plurality of regions between projections over the surface area, each region corresponding in shape to a support rim of a container and overlapping at least one other of the regions, each region capable of accepting the support rim between projections so that when the container is set on the non-skid surface at a selected region, the support rim rests solely on the upper surface of the base layer.

13. A method of forming a non-skid surface for containers, the method comprising the steps of:
   selecting at least a size and a shape of a first container bottom rim;
   plotting a plurality of first container rim locations in a first repeating location pattern of a desired spacing for the non-skid surface such that each of the first container rim locations overlaps with at least one other first container rim location, the first container rim locations corresponding to the first container bottom rim size and shape; and
   forming a plurality of protrusions on a substrate for the non-skid work surface disposed spaced apart over and projecting upward relative to the substrate over a substantial portion of a surface area of the substrate, the plurality of protrusions being arranged in a repeating bump pattern that corresponds to the first repeating location pattern so as not to overlie the plurality of first container rim locations.

14. A method according to claim 13, further comprising the steps of:
   selecting at least a size and a shape of a second container bottom rim;
   plotting a plurality of second container rim locations in a second repeating location pattern of a desired spacing over the first repeating location pattern such that each of the second container rim locations overlaps with at least one other first or second container rim location, the second container rim locations corresponding to the second bottom rim size and shape; and
   forming the plurality of protrusions on the surface so as not to overlie the plurality of second container rim locations.

15. A method according to claim 13, wherein the steps of plotting and forming are performed substantially simultaneously by selecting a cutting device having a size and shape representing the first container bottom rim, positioning the cutting device at each of the first container rim locations, and cutting into the non-skid work surface to a desired depth at each of the first container rim locations, thereby leaving behind the plurality of protrusions extending from the non-skid work surface.

16. A method according to claim 14, wherein the steps of plotting and forming for each of the first and second container bottom rims, respectively, are performed substantially simultaneously by selecting a first cutting device having a size and shape representing the first container bottom rim, positioning the first cutting device at each of the first container rim locations, and cutting into the non-skid work surface to a desired depth at each of the first container rim locations, and also by selecting a second cutting device having a size and shape representing the second container bottom rim, positioning the second cutting device at each of the second container rim locations, and cutting into the non-skid work surface to a desired depth at each of the second container rim locations, thereby leaving behind the plurality of protrusions extending from the non-skid work surface.

17. A method according to claim 13, wherein the step of plotting is performed by a computerized CNC machine and the step of forming is performed by the CNC machine cutting the first container rim locations into the non-skid work surface to a desired depth, thereby leaving behind the plurality of protrusions.

18. A method according to claim 14, wherein the steps of plotting are performed by a computerized CNC machine and the steps of forming are performed by the CNC machine cutting the first and the second container rim locations into the non-skid work surface to a desired depth, thereby leaving behind the plurality of protrusions.

19. A method according to claim 13, wherein the step of forming is performed by a stereolithography process.

20. A method according to claim 14, wherein the steps of forming are performed by a stereolithography process.

* * * * *

UNITED STATES PATENT AND TRADEMARK OFFICE
CERTIFICATE OF CORRECTION

PATENT NO. : 6,703,110 B2
DATED : March 9, 2004
INVENTOR(S) : David M. Stitchick It is certified that error appears in the above-identified patent and that said Letters Patent is hereby corrected as shown below:

Column 6,
Line 53, delete "pianar" and insert -- planar --.

Signed and Sealed this

Eighth Day of February, 2005

JON W. DUDAS
*Director of the United States Patent and Trademark Office*